United States Patent
Zhang et al.

(10) Patent No.: US 9,880,423 B2
(45) Date of Patent: Jan. 30, 2018

(54) MANUFACTURING METHOD OF ALIGNMENT LAYER AND MANUFACTURING METHOD OF DISPLAY SUBSTRATE

(71) Applicants: BOE Technology Group Co., Ltd., Beijing (CN); Beijing BOE Optoelectronics Technology Co., Ltd., Beijing (CN)

(72) Inventors: Feifei Zhang, Beijing (CN); Xiaohui Yi, Beijing (CN); Wenpeng Zhang, Beijing (CN); Xiao Xin, Beijing (CN); Xing Qin, Beijing (CN); Peiqiang Guan, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 15/278,927

(22) Filed: Sep. 28, 2016

(65) Prior Publication Data
US 2017/0199408 A1    Jul. 13, 2017

(30) Foreign Application Priority Data
Jan. 7, 2016    (CN) .......................... 2016 1 0009395

(51) Int. Cl.
*H01L 21/00*    (2006.01)
*G02F 1/1337*    (2006.01)
*G02F 1/1362*    (2006.01)
*G02F 1/1335*    (2006.01)
*G02F 1/1343*    (2006.01)

(52) U.S. Cl.
CPC ...... *G02F 1/13378* (2013.01); *G02F 1/13439* (2013.01); *G02F 1/133516* (2013.01); *G02F 1/136286* (2013.01); *G02F 2001/136295* (2013.01); *G02F 2201/123* (2013.01)

(58) Field of Classification Search
CPC ........... G02F 1/13378; G02F 1/133516; G02F 1/13439
USPC ....................................... 438/158
See application file for complete search history.

(56) References Cited

U.S. PATENT DOCUMENTS

| | | | |
|---|---|---|---|
| 2010/0289984 A1* | 11/2010 | Kishioka | G02B 5/3016 349/62 |
| 2014/0057200 A1* | 2/2014 | Lin | G02F 1/133788 430/20 |
| 2017/0123126 A1* | 5/2017 | Yang | G02B 5/3058 |

* cited by examiner

*Primary Examiner* — Anthony Ho
(74) *Attorney, Agent, or Firm* — Banner & Witcoff, Ltd.

(57) ABSTRACT

A manufacturing method of an alignment layer and a manufacturing method of a display substrate are provided. The manufacturing method of the alignment layer includes: providing a display substrate on which a patterned structure is formed; applying the entire display substrate with wetting fluid, wherein the wetting fluid can be fused with alignment liquid; transferring the alignment liquid on the display substrate applied with the wetting fluid by a transfer roller; and curing the alignment liquid to form an alignment layer. The manufacturing method is used for producing the alignment layer on the display substrate.

20 Claims, 1 Drawing Sheet

MANUFACTURING METHOD OF ALIGNMENT LAYER AND MANUFACTURING METHOD OF DISPLAY SUBSTRATE

This application claims priority to and the benefit of Chinese Patent Application No. 201610009395.0 filed on Jan. 7, 2016, which application is incorporated herein in its entirety.

TECHNICAL FIELD

Embodiments of the present disclosure relate to a manufacturing method of an alignment layer and a manufacturing method of a display substrate.

BACKGROUND

A liquid crystal display device has advantages of low power consumption, low radiation, thin body and the like, and is more and more widely applied. The liquid crystal display device includes a display substrate, an alignment layer is arranged on the display substrate, and the alignment layer is used for enabling liquid crystal molecules in the liquid crystal display device to have an initial orientation.

SUMMARY

Embodiments of the present disclosure provide a manufacturing method of an alignment layer and a manufacturing method of a display substrate.

According to at least one embodiment of the present disclosure, a manufacturing method of an alignment layer is provided, including: providing a display substrate on which a patterned structure is formed; applying the entire display substrate with wetting fluid, wherein the wetting fluid can be fused with alignment liquid; transferring the alignment liquid on the display substrate covered with the wetting fluid by a transfer roller; and curing the alignment liquid to form an alignment layer.

Embodiments of the present disclosure, a manufacturing method of a display substrate is provided, including: forming an alignment layer on the display substrate by using the manufacturing method of the alignment layer.

BRIEF DESCRIPTION OF THE DRAWINGS

Embodiments of the present disclosure will be illustrated in more details in connection with the drawings so as to enable those skilled in the art to more clearly understand the embodiments of the present disclosure, in which.

DETAILED DESCRIPTION

The technical solutions of the embodiments of the disclosure will be described in details in connection with the drawings related to the embodiments of the disclosure. It is apparent that the described embodiments are just a part but not all of the embodiments of the disclosure. Based on the described embodiments herein, those skilled in the art can obtain other embodiment(s), without any inventive work, which should be within the scope of the disclosure.

A production process of an alignment layer of a display substrate includes: washing the display substrate; transferring alignment liquid on the display substrate by a transfer roller; and curing the alignment liquid on the display substrate to form the alignment layer.

However, the present inventors found that the production process of the alignment layer has some defects. For example, due to the existence of a patterned structure on the display substrate, the transfer roller cannot contact regions at two sides of the patterned structure on the display substrate so that the transfer roller cannot transfer the alignment liquid to the regions, thus the alignment layer cannot be formed in the regions, and liquid crystal molecules corresponding to the regions cannot be normally aligned, resulting in a bad display effect of a liquid crystal display apparatus.

First Embodiment

Figure 1:
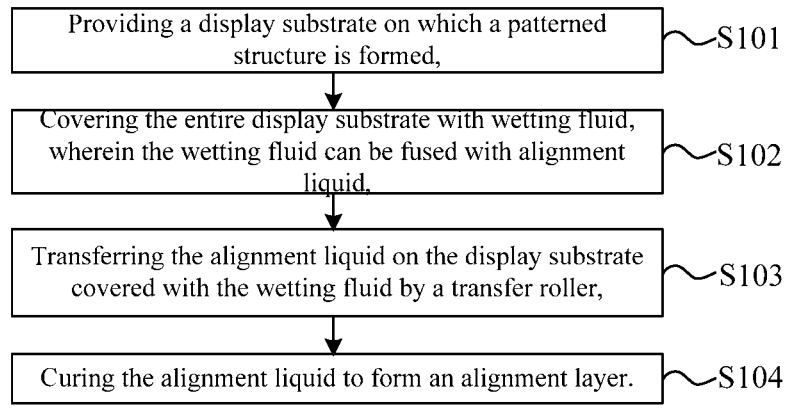
FIG. 1 is a flow chart of a manufacturing method of an alignment layer in an embodiment of the present disclosure.

An embodiment of the present disclosure provides a manufacturing method of an alignment layer. As shown in FIG. 1, the manufacturing method of the alignment layer includes following steps.

S101: providing a display substrate on which a patterned structure is formed. Exemplarily, the display substrate can be an array substrate or a color filter substrate. In an instance the display substrate is an array substrate, the display substrate includes a base substrate, a thin film transistor arranged on the base substrate, a passivation layer covering the thin film transistor and a pixel electrode positioned on the passivation layer, and in the case, the patterned structure on the display substrate is the pixel electrode; In an instance that the display substrate is a color filter substrate, the display substrate includes a base substrate, a black matrix and a color resist layer which are arranged on the base substrate, and a common electrode positioned on the black matrix and the color resist layer, and in the case, the patterned structure on the display substrate is the common electrode. Optionally, the color resist layer includes a red region, a green region and a blue region.

S102: covering the entire display substrate with wetting fluid. The wetting fluid can be fused with alignment liquid. For example, the wetting fluid is a solvent in the alignment liquid, so that the alignment liquid can be relatively easily fused with the wetting fluid, which is beneficial for forming the alignment layer with a uniform thickness on the entire display substrate. In addition, before the step S102, the manufacturing method of the alignment layer, which is provided by the embodiment of the present disclosure, can further include: washing the display substrate so as to remove impurities on the surface of the display substrate.

S103: transferring the alignment liquid on the display substrate covered with the wetting fluid by the transfer roller. A time interval between the step S103 and the step S102 is less than or equal to 10 mins, for example, so as to allow the wetting fluid not to be fully volatilized before the step of transferring the alignment liquid on the display substrate covered with the wetting fluid by the transfer roller, so that the alignment liquid can be transferred on the wetting fluid covering the display substrate. The step S103 can be performed according to a conventional transfer method and device, and it is not repeated herein in detail.

Figure 2:
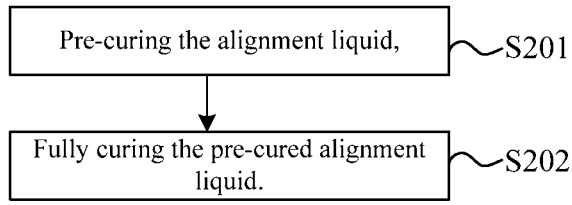
FIG. 2 is a flow chart of a curing method of alignment liquid in an embodiment of the present disclosure.

S104: curing the alignment liquid to form an alignment layer. For example, the step S104 can have various implementation modes. Exemplarily, in an embodiment of the present disclosure, as shown in FIG. 2, the step of curing the alignment liquid includes: S201: pre-curing the alignment liquid; and S202: and fully curing the pre-cured alignment liquid. Before the alignment liquid is fully cured, the alignment layer is firstly pre-cured, and thus, in the process of pre-curing the alignment liquid, most of the solvent in the alignment liquid can be volatilized, so that bubbles generated due to volatilization of the solvent in the alignment liquid in the process of fully curing the alignment liquid can be reduced, which is beneficial for forming the relatively dense alignment layer.

For example, the step S201, i.e., the pre-curing of the alignment liquid, includes: heating the alignment liquid to a certain temperature, and keeping for proper time. However, the inventors found that if the alignment liquid were heated to an excessively low temperature, most of the solvent in the alignment liquid cannot be volatilized; and if the alignment liquid were heated to an excessively high temperature, excessively drastic volatilization of the solvent in the alignment liquid can be happened, so that bubbles will be left in the cured alignment layer, which is unbeneficial for forming the relatively dense alignment layer. Moreover, when the alignment liquid is heated to a suitable temperature and if holding time were too short, most of the solvent in the alignment liquid still cannot be volatilized, and if the holding time were too long, low production efficiency will be caused. Therefore, the alignment liquid is heated to a proper temperature and the heating is kept for a time period proper for the temperature. Exemplarily, when the alignment liquid is pre-cured, the alignment liquid can be heated to 90° C. to 120° C., and the heating is kept for 60 s to 120 s.

Similarly, the step S202, i.e., the fully curing of the pre-cured alignment liquid, for example, includes: heating the pre-cured alignment liquid to a certain temperature, keeping for proper time period, heating the pre-cured alignment liquid to a suitable temperature and keeping for a time period proper for the temperature. Exemplarily, when the pre-cured alignment liquid is fully cured, the pre-cured alignment liquid is heated to 200° C. to 300° C., and heating is kept for 20 mins to 30 mins.

Figure 3:
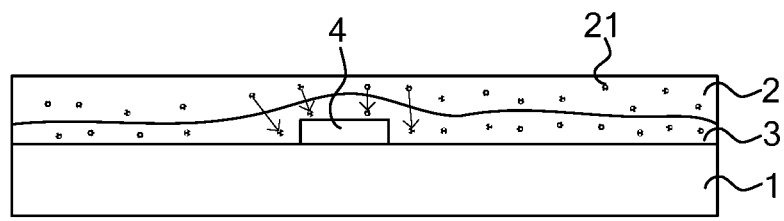
FIG. 3 is a principle schematic diagram of mixing wetting fluid and alignment liquid in an embodiment of the present disclosure.

As shown in FIG. 3, before the alignment liquid 2 is transferred on the display substrate 1 by a transfer roller, the entire display substrate 1 is covered with the wetting fluid 3, and the wetting fluid 3 can be fused with the alignment liquid 2, so that when the alignment liquid 2 is transferred on the display substrate 1 by the transfer roller, the alignment liquid 2 on the transfer roller can be fused with the wetting fluid 3 on the display substrate 1, solute 21 in the alignment liquid 2 can be diffused into the wetting fluid 3 (arrows in FIG. 3 represent diffusion directions of the solute 21 in the alignment liquid 2); and due to coverage of the wetting fluid 3 on the entire display substrate 1, the solute 21 in the alignment liquid 2 can reach regions at both sides of the patterned structure 4 on the display substrate, so that the alignment layer can also be formed in the regions, and the alignment layer can be formed on the entire display substrate 1 to enable all the liquid crystal molecules in the liquid crystal display apparatus to be normally oriented, which is beneficial for improving a display effect of the liquid crystal display apparatus.

Moreover, in the prior art, after the display substrate 1 is washed, organics will be left on the substrate, and the alignment liquid 2 cannot be attached to the organics, thus, the transfer roller cannot transfer the alignment liquid 2 to the position of the organics on the display substrate 1, so that the alignment layer cannot be formed at the position. Due to this, the liquid crystal molecules corresponding to the position cannot be normally oriented, and a bad display effect of the liquid crystal display apparatus happens.

In the manufacturing method of the alignment layer, which is provided by the embodiment of the present disclosure, due to coverage of the wetting fluid 3 on the entire display substrate 1, the solute 21 in the alignment liquid 2 can be attached to the position of the organics on the display substrate 1, so that the alignment layer can be formed on the entire display substrate 1 to enable the liquid crystal molecules in the liquid crystal display apparatus to be normally oriented, which is beneficial for improving the display effect of the liquid crystal display apparatus.

In order to facilitate understanding and implementation, the exemplary embodiment of the step S102 will be further described as follows:

For example, the step S102, i.e., the covering of the entire display substrate 1 with the wetting fluid 3, in which the wetting fluid 3 can be fused with the alignment liquid 2, can have various implementation modes. Exemplarily, in the embodiment of the present disclosure, for example, two embodiments of covering the entire display substrate 1 with the wetting fluid 3 are provided as examples: the entire display substrate 1 is covered with the wetting fluid 3 by using a flexible hair brush, or the entire display substrate 1 is covered with the wetting fluid 3 by using a spray device, however, the embodiments of the present disclosure are not limited hereto. When the entire display substrate 1 is covered with the wetting fluid 3 by using the flexible hair brush, cost of covering the entire display substrate 1 with the wetting fluid 3 is low; and when the entire display substrate 1 is covered with the wetting fluid 3 by using a spray device, the wetting fluid 3 can form uniform fog drops by a spraying pressure, so that the entire display substrate 1 can be uniformly covered with the wetting fluid 3, which is beneficial for forming the alignment layer with the uniform thickness on the entire display substrate 1.

Furthermore, for example, the inventors found that in the process of covering the entire display substrate 1 with the wetting fluid 3 by using a spray device, the spray device can be a spray gun, for example. If the opening or nozzle of the spray gun has a small diameter, the spray gun is likely to be blocked by the wetting fluid 3 so that the spraying process cannot be successfully carried out; and if the nozzle of the used spray gun has a large diameter, a volume of the wetting fluid 3 sprayed to the display substrate 1 by the spray gun is difficult to be controlled so as to result in the uneven volume of the wetting fluid 3 sprayed to the display substrate 1 by the spray gun, which is not helpful for forming the alignment layer with a uniform thickness. Therefore, in the process of covering the entire display substrate 1 with the wetting fluid 3 by using a spray device, the diameter of the nozzle of a used spray device should be properly selected. For example, in the process of covering the entire display substrate 1 with the wetting fluid 3 by using a spray gun, nozzle of the used spray gun has a diameter 0.1 mm to 0.2 mm.

Moreover, when the solute 21 in the alignment liquid 2 is polyimide, the solvent in the alignment liquid 2 can be selected from a group consisting of N-methyl pyrrolidone, γ-butyrolactone, butyl carbitol and Ethyl 3-ethoxypropionate. When the solvent in the alignment liquid 2 is at least one of the plurality of materials above, the solvent in the alignment liquid 2 has the beneficial effects as follows: the solvent in the alignment liquid 2 is an inert polar solvent, which has high stability and high dissolving capacity for the polyimide, so that the polyimide can be uniformly distributed in the alignment liquid 2, which is beneficial for forming the alignment layer with a uniform thickness; the solvent in the alignment liquid 2 has a high boiling point, and the boiling point of the solvent is lower than a curing temperature of the alignment liquid 2, so that in the process of curing the alignment liquid 2, bubbles cannot be left in the alignment layer formed after curing due to boiling of the solvent in the alignment liquid 2, which is beneficial for forming the relatively dense alignment layer; a complexation reaction cannot be happened between the solvent in the alignment liquid 2 and the polyimide, thus, the polyimide will not be degenerated, and the alignment layer can be formed on the display substrate 1; before the alignment liquid 2 is transferred on the display substrate 1 by the transfer roller, a condensation reaction can be happened for part of polyimide in the alignment liquid 2, and the solvent in the alignment liquid 2 can keep high dissolving capacity for the polyimide subjected to the condensation reaction, which is beneficial for forming the alignment layer with a uniform thickness.

Moreover, the inventors found that when the solute 21 in the alignment liquid 2 is the polyimide, if the mass percentage of the polyimide in the alignment liquid 2 is excessively low, the alignment liquid 2 cannot be cured into a film, so that the alignment layer cannot be formed; and if the mass percentage of the polyimide in the alignment liquid 2 is excessively high, the alignment liquid 2 can be excessively viscous, so that liquidity of the alignment liquid 2 on the display substrate 1 is poor, which is not beneficial for forming the alignment layer with a uniform thickness. Therefore, the mass percentage of the polyimide in the alignment liquid 2 should be properly selected. In an embodiment of the present disclosure, the mass percentage of the polyimide in the alignment liquid 2, for example, is 3% to 7%.

Second Embodiment

The embodiments of the present disclosure also provide a manufacturing method of a display substrate. The manufacturing method of the display substrate includes: producing an alignment layer on the display substrate by using the manufacturing method of the alignment layer according to the first embodiment.

The manufacturing method of the display substrate, which is provided by the embodiment of the present disclosure, includes: forming the alignment layer on the display substrate by using the manufacturing method of the alignment layer according to the first embodiment, and thus, the manufacturing method of the display substrate has the same advantageous effects as the manufacturing method of the alignment layer according to the first embodiment, which are not repeated herein in detail.

For example, In an instance that the display substrate is an array substrate, the manufacturing method of the display substrate can further include: forming a gate metal layer on a base substrate, and forming a pattern including a gate electrode by a patterning process; forming a gate insulating layer on the base substrate on which the gate electrode is formed; forming a semiconductor layer on the base substrate on which the gate insulating layer is formed, and forming a pattern including an active layer by a patterning process; forming a source-drain metal layer on the base substrate on which the active layer is formed, and forming a pattern including a source electrode and a drain electrode by a patterning process; forming a passivation layer on the base substrate on which the source electrode and the drain electrode are formed; and forming a transparent conducting layer on the base substrate on which the passivation layer is formed, forming a pattern including a pixel electrode by a patterning process, and then, forming an alignment layer on the display substrate by using the manufacturing method of the alignment layer according to the first embodiment.

For example, in an instance that the display substrate is a color filter substrate, the manufacturing method of the display substrate can further include: coating black photosensitive resin on the base substrate, and forming a black matrix by a patterning process; coating red photosensitive resin on the base substrate on which the black matrix is formed, and forming a red region of a color resist layer by a patterning process; coating green photosensitive resin on the base substrate on which the red region of the color resist layer is formed, and forming a green region of the color resist layer by a patterning process; coating blue photosensitive resin on the base substrate on which the green region of the color resist layer is formed, and forming a blue region of the color resist layer by a patterning process; and forming a transparent conducting layer on the base substrate on which the color resist layer is formed, forming a pattern including a common electrode by a patterning process, and then, forming the alignment layer on the display substrate by using the manufacturing method of the alignment layer according to the first embodiment.

The described above are just exemplary embodiments to explain the principle of the present disclosure and the disclosure is not intended to be limited thereto. An ordinary person in the art can make various variations and modifications to the present disclosure without departure from the spirit and the scope of the present disclosure, and such variations and modifications shall fall in the scope of the present disclosure.

The present application claims the benefits and priority of the Chinese Patent Application No. 201610009395.0 filed on Jan. 7, 2016 and entitled 'Manufacturing Method of Alignment Layer and Manufacturing Method of Display Substrate', the entire contents of which are incorporated herein by reference.

What is claimed is:

1. A manufacturing method of an alignment layer, comprising:
    providing a display substrate on which a patterned structure is formed;
    applying the entire display substrate with a wetting fluid, wherein the wetting fluid can be fused with an alignment liquid;
    then, transferring, by use of a transfer roller, the alignment liquid to the display substrate covered with the wetting fluid; and
    curing the alignment liquid to form an alignment layer.

2. The manufacturing method of the alignment layer according to claim 1, wherein the applying the entire display substrate with the wetting fluid comprises applying the entire display substrate with the wetting fluid by using a flexible hair brush.

3. The manufacturing method of the alignment layer according to claim 1, wherein the applying the entire display substrate with the wetting fluid comprises applying the entire display substrate with the wetting fluid by using a spray device.

4. The manufacturing method of the alignment layer according to claim 3, wherein the spray device is a spray gun, the spray gun has an opening with a diameter 0.1 mm to 0.2 mm.

5. The manufacturing method of the alignment layer according to claim 1, wherein the wetting fluid is a solvent in the alignment liquid.

6. The manufacturing method of the alignment layer according to claim 5, wherein a solute in the alignment liquid is polyimide, the solvent in the alignment liquid is selected from a group consisting of N-methyl pyrrolidone, γ-butyrolactone, butyl carbitol and Ethyl 3-ethoxypropionate.

7. The manufacturing method of the alignment layer according to claim 6, wherein a mass percentage of the polyimide in the alignment liquid is 3% to 7%.

8. The manufacturing method of the alignment layer according to claim 1, wherein a time interval between the applying of the entire display substrate with the wetting fluid and the transferring of the alignment liquid to the display substrate applied with the wetting fluid is less than or equal to 10 mins.

9. The manufacturing method of the alignment layer according to claim 1, wherein the curing the alignment liquid comprises:
pre-curing on the alignment liquid; and
fully curing the pre-cured alignment liquid.

10. The manufacturing method of the alignment layer according to claim 9, wherein the pre-curing on the alignment liquid comprises heating the alignment liquid to 90° C. to 120° C., and keeping for 60 s to 120 s so as to pre-cure the alignment liquid.

11. The manufacturing method of the alignment layer according to claim 9, wherein the fully curing the pre-cured alignment liquid comprises: heating the pre-cured alignment liquid to 200° C. to 300° C., and keeping for 20 min to 30 mins so as to fully cure the pre-cured alignment liquid.

12. A manufacturing method of a display substrate, comprising:
forming an alignment layer on the display substrate, wherein the forming the alignment layer comprises:
providing a display substrate on which a patterned structure is formed;
applying the entire display substrate with a wetting fluid, wherein the wetting fluid can be fused with an alignment liquid;
then, transferring, by use of a transfer roller, the alignment liquid to the display substrate covered with the wetting fluid; and
curing the alignment liquid to form the alignment layer.

13. The manufacturing method of the display substrate according to claim 12, wherein in a case the display substrate is an array substrate, the manufacturing method further comprises:
forming a gate metal layer on a base substrate, and forming a pattern including a gate electrode by a patterning process;
forming a gate insulating layer on the base substrate on which the gate electrode is formed;
forming a semiconductor layer on the base substrate on which the gate insulating layer is formed, and forming a pattern including an active layer by a patterning process;
forming a source-drain metal layer on the base substrate on which the active layer is formed, and forming a pattern including a source electrode and a drain electrode by a patterning process;
forming a passivation layer on the base substrate on which the source electrode and the drain electrode are formed; and
forming a transparent conducting layer on the base substrate on which the passivation layer is formed, and forming a pattern including a pixel electrode by a patterning process.

14. The manufacturing method of the display substrate according to claim 12, wherein in a case the display substrate is a color filter substrate, the manufacturing method further comprises:
applying black photosensitive resin on the base substrate, and forming a black matrix by a patterning process;
applying red photosensitive resin on the base substrate on which the black matrix is formed, and forming a red region of a color resist layer by a patterning process;
applying green photosensitive resin on the base substrate on which the red region of the color resist layer is formed, and forming a green region of the color resist layer by a patterning process;
applying blue photosensitive resin on the base substrate on which the green region of the color resist layer is formed, and forming a blue region of the color resist layer by a patterning process; and
forming a transparent conducting layer on the base substrate on which the color resist layer is formed, and forming a pattern including a common electrode by a patterning process.

15. A manufacturing method of an alignment layer, comprising:
providing a display substrate on which a patterned structure is formed;
applying the entire display substrate with a wetting fluid by using a spray device, wherein the wetting fluid can be fused with an alignment liquid;
then, transferring, by use of a transfer roller, the alignment liquid to the display substrate covered with the wetting fluid; and
curing the alignment liquid to form the alignment layer.

16. The manufacturing method of the alignment layer according to claim 15, wherein the spray device is a spray gun, the spray gun has an opening with a diameter 0.1 mm to 0.2 mm.

17. The manufacturing method of the alignment layer according to claim 15, wherein the wetting fluid is a solvent in the alignment liquid.

18. The manufacturing method of the alignment layer according to claim 17, wherein a solute in the alignment liquid is polyimide, the solvent in the alignment liquid is selected from a group consisting of N-methyl pyrrolidone, γ-butyrolactone, butyl carbitol and Ethyl 3-ethoxypropionate.

19. The manufacturing method of the alignment layer according to claim 18, wherein a mass percentage of the polyimide in the alignment liquid is 3% to 7%.

20. The manufacturing method of the alignment layer according to claim 15, wherein a time interval between the applying of the entire display substrate with the wetting fluid and the transferring of the alignment liquid to the display substrate applied with the wetting fluid by the transfer roller is less than or equal to 10 mins.

* * * * *